UNITED STATES PATENT OFFICE 2,491,924

NITROAMIDES OF AROMATIC ACIDS

Harold G. Johnson, Glendale, Mo., assignor to Commercial Solvents Corporation, Terre Haute, Ind., a corporation of Maryland No Drawing. Application October 31, 1947, Serial No. 783,456

4 Claims. (Cl. 260—556)

My invention relates to new (2-nitroalkyl)-amides and to a method for preparing same. It relates particularly to nitroamides having the following general formula:

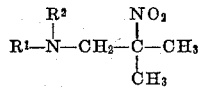

wherein $R^1$ may be benzoyl or phenylsulfonyl, and $R^2$ may be alkyl, aryl or aralkyl.

As illustrative of the compounds of my invention there may be mentioned N-(2-nitroisobutyl)-N-phenylbenzamide, N-(isopropyl)-N-(2-nitroisobutyl)benzamide, N-(isopropyl)-N-(2-nitroisbutyl)benzenesulfonamide, N-(benzyl)-N-(2-nitroisobutyl)benzamide, N-(benzyl)-N-(2-nitroisobutyl)benzenesulfonamide, and the like.

The compounds of my invention may be prepared by reacting a N-substituted 2-nitroalkyl amine having the following general formula:

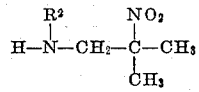

wherein the $R^2$ substituent is as described above, with an acylating agent such as an acyl halide, or the like.

In carrying out my invention the reactants are mixed under suitable temperature conditions and reaction permitted to take place. As illustrated by the examples which follow, gentle refluxing is desirable with certain reactants while cooling the reaction mixture gives better results with other reactants. The reactants may be the only constituents of the mixture or, if desired, they may be reacted in the presence of a mutual solvent which is inert under the conditions of the reaction.

After completion of the reaction, the nitroamide may be recovered by pouring the mixture into an aqueous basic solution. After permitting the mixture to separate into two layers the oily layer is recovered and acidified, for example, with dilute hydrochloric acid, and a second separation effected. The resulting oily layer is then washed with water, whereupon the N-(2-nitroalkyl)-amide may then be recovered by crystallization.

As illustrative of the N-(2-nitroalkyl) amines which may be used in carrying out my invention, the following are cited: N-(2-nitroisobutyl)aniline, N-(2-nitroisobutyl)-N-methylamine, N-(2-nitroisobutyl)-isopropylamine, N-(2-nitroisobutyl)benzylamine, and the like.

As the acylating agents there may be used the acyl halides such as benzoyl chloride, methyl benzoyl chloride, benzenesulfonyl chloride, and the like.

In general the reaction is preferably carried out in the presence of a mutual solvent for the reactants, which is relatively inert to the reaction such as, for example, tertiary amines such as pyridine, triethylamine, or in dioxane, benzenes, the alkyl ethers, and the like.

The following specific examples will further illustrate my invention.

Example I

In a flask connected to a reflux condenser 12.1 parts of N-(2-nitroisobutyl)aniline, 100 parts of pyridine and 13.3 parts of benzoyl chloride were placed and the mixture refluxed gently for six hours. The reaction mixture was then poured into a 6 N-solution of sodium hydroxide and shaken thoroughly. The two layers separated and the oily pyridine portion was acidified with dilute hydrochloric acid, whereupon two layers again separated. The oily layer was then washed with water to remove chlorides and again allowed to stand, whereupon crystals of N-(2-nitroisobutyl)-N-phenylbenzamide separated. The latter, upon recovery and recrystallization, had a melting point of 98° C., a saponification equivalent of 272.9 as compared to a calculated value of 298, and a nitrogen analysis of 9.30% as compared to 9.39 for the calculated value.

Example II

To 100 g. of pyridine in a glass stoppered flask was added 40 g. of N-(2-nitroisobutyl)isopropylamine. After chilling the resulting mixture in an ice bath 35.2 g. of benzoyl chloride was slowly added with shaking while keeping the mixture cold. The reaction mixture was then permitted to stand in an ice bath over night and finally permitted to come gradually to room temperature. The mixture was next poured into 6 N sodium hydroxide and shaken vigorously, and the water layer removed. Dilute HCl was next added with cooling and the water layer which formed was removed. The resulting oil was washed repeatedly with water and gradually changed into a dark solid which was purified by crystallization from methanol. Four successive recrystallizations gave 10.2 grams of white crystals, with 6.5 grams as a second crop, or a 25% yield of N-(isopropyl)-N-(2-nitroisobutyl)benzamide. These crystals had a melting point of 70-72° C. and gave a nitrogen analysis of 10.76 as compared to the theoretical of 10.60 for $C_{14}H_{20}N_2O_3$.

Example III

After chilling a mixture of 40 g. of N-(2-nitroisobutyl)isopropylamine and 100 grams of pyridine, 44.15 g. of benzenesulfonylchloride was slowly added with shaking and cooling. After allowing the reaction mixture to stand over night it was added to about 50 ml. of 6 N sodium hydroxide and shaken vigorously for twenty minutes. The resulting oil layer was washed with dilute HCl and the resulting water layer removed. After washing the oil layer further with water the product solidified and was purified by four successive crystallizations from hot methanol, giving a 33% yield of N-(isopropyl)-N-(2-nitroisobutyl)-benzenesulfonamide which melted at 101–103° C. and gave a nitrogen analysis of 9.20 as compared to the theoretical value of 9.33.

Example IV

A mixture of 13.9 g. of N-(2-nitroisobutyl)-benzylamine and 100 g. of pyridine was chilled and 10.5 g. of benzoyl chloride slowly added to the mixture while shaking and chilling. The reaction mixture was allowed to warm to room temperature and after six hours poured into 6 N sodium hydroxide and shaken. The resulting water layer was removed and the oil treated with dilute HCl and afterwards washed several times with water. The yellow solid thus obtained was purified by crystallizing three times from hot methanol. A 52% yield of N-(benzyl)-N-(2-nitroisobutyl)benzamide having a melting point of 124–127° C. and a nitrogen analysis of 8.58 as compared to the theoretical of 8.97 was thus obtained.

Example V

A mixture of 10.7 g. of N-(2-nitroisobutyl)-benzylamine and 100 g. of pyridine was prepared and 9.5 g. of benzenesulfonyl chloride slowly added with shaking and chilling. After four hours the reaction mixture was poured into 6 N sodium hydroxide and shaken. The resulting oily layer was treated with dilute HCl and the oily layer then washed with water. The solid thus obtained was purified by three successive crystallizations from methanol. A yield of 22% of N-(benzyl)-N-(2-nitroisobutyl)benzenesulfonamide having a melting point of 99° C. and a nitrogen analysis of 7.76 as compared to the calculated value of 8.04 for $C_{17}H_{20}N_2SO_4$ was obtained.

The new N-(2-nitroalkyl)amides of my invention are useful in organic syntheses, particularly in the preparation of detergents, wetting agents, and cation active softening agents.

While the above describes the preferred embodiments of my invention, it is to be understood that departures may be made therefrom within the scope of the specification and claims.

What is claimed is:

1. As new compositions of matter N-(2-nitroalkyl)amides having the following general formula:

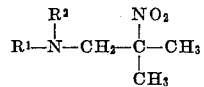

wherein $R^1$ is a radical selected from the group consisting of benzoyl and phenylsulfonyl, and $R^2$ is a radical selected from the group consisting of alkyl, aryl, and aralkyl.

2. N-(2-nitroisobutyl)-N-phenyl benzamide.

3. N-(isopropyl)-N-(2-nitroisobutyl)benzamide.

4. N-(Isopropyl)-N-(2-nitroisobutyl)benzenesulfonamide.

HAROLD G. JOHNSON.

REFERENCES CITED

The following references are of record in the file of this patent:

UNITED STATES PATENTS

| Number | Name | Date |
|---|---|---|
| 2,206,885 | Dickey | July 9, 1940 |
| 2,393,825 | Senkus | Jan. 29, 1946 |
| 2,413,248 | Senkus | Dec. 24, 1946 |

OTHER REFERENCES

Braun et al., "Ber. deut. chem.," vol. 67 (1934), pp. 1056 to 1060.

Degering, "An Outline of Organic Nitrogen Compounds," (1945) pp. 492 and 493.